July 4, 1950 W. R. KOCH 2,513,727

FREQUENCY MODULATION RECEIVER

Filed Aug. 3, 1945

INVENTOR.
WINFIELD R. KOCH
BY H. G. Grover
ATTORNEY

Patented July 4, 1950

2,513,727

UNITED STATES PATENT OFFICE 2,513,727

FREQUENCY MODULATION RECEIVER

Winfield R. Koch, Haddonfield, N. J., assignor to Radio Corporation of America, a corporation of Delaware Application August 3, 1945, Serial No. 608,677

3 Claims. (Cl. 250—20)

My present invention generally relates to an improvement in receivers of angle modulated carrier waves, and more particularly to an improved frequency modulation receiver.

In the reception of angle modulated carrier waves it is necessary that the rectifier device of the demodulator of the receiver be presented with modulated carrier wave energy whose amplitude variations are an accurate representation of the angle modulations of the received waves. This is insured by employing an amplitude limiting device prior to the discriminator section of the demodulator so as to prevent undesired amplitude variations in the received angle modulated waves from causing a response in the output of the rectifier device. The generic term "angle modulated" is to be understood as including frequency modulation (FM), or phase modulation (PM), or hybrid modulations having characteristics of both FM and PM. By way of specific illustration the present description will be explained in connection with a system for receiving FM carrier waves, although my invention is not restricted to such reception.

One of the most widely known and used forms of discriminator-rectifier circuits is that disclosed and claimed by S. W. Seeley in his U. S. Patent No. 2,121,103, granted June 21, 1938. As commonly used in accordance with the Seeley patent, the discriminator section comprises a pair of coupled resonant circuits each tuned to a predetermined operating frequency. The latter is usually the intermediate frequency (I. F.) of a receiver of the widely-used superheterodyne type. The primary of the two coupled circuits is usually included in the plate circuit of the limiter tube. A pair of opposed rectifier devices are connected to opposed ends of the secondary circuit coil, which is center-tapped. The rectified voltages developed across the respective output load resistors of the rectifier devices are combined in polarity opposition, and the resultant voltage is accurately representative of the frequency variations of the received FM waves.

The well known "frequency deviation vs. voltage output" characteristic of the Seeley demodulator system is generally an inclined, approximately linear characteristic whose upper and lower ends are bent in opposite directions. The linearity of the characteristic depends upon the degree of coupling between the primary and secondary circuits of the discriminator section, and the effective selectivity of these circuits. Usually the coupling is approximately critical coupling, under which condition the primary circuit voltage response has a pronounced double hump. Unlike the normal I. F. transformers preceding the limiter tube, the response curve of the primary of the discriminator transformer is of large importance. The pronounced, double-hump response of the primary provides a "correction" for inherent central curvature in the normal "frequency deviation vs. voltage output" characteristic of the demodulator.

Analysis demonstrates that the diodes and respective load resistors effectively act as a load on the primary circuit of the discriminator section. The diode loading of the primary circuit of the discriminator may, in general, assume such magnitude that the gain through the discriminator is low. The seriousness of the diode loading depends on a number of factors. When a high I. F. value is used, the discriminator circuits must have high effective "Q's" to be selective enough, and any loading is serious. The value of the load resistors cannot be increased too much, or hum pickup and poor time constants result, with unbalances of the discriminator for higher audio frequencies, which permits noise to come through.

In accordance with one object of my present invention a negative resistance effect is introduced into the discriminator primary circuit thereby effectively to reduce the loading of the primary.

In accordance with another object of my invention, the existing amplitude limiter feeding into the discriminator section is utilized for providing regeneration for the discriminator primary circuit whereby with increasing signal strength the magnitude of regeneration will become less and will produce a broader discriminator selectivity with resulting less difficulty with tuning and less possibility of distortion, while a narrower discriminator selectivity will be secured for weak signals with high gain and less noise and interference. The increased selectivity will insure less interference from adjacent channel stations, and the narrowed band will result in louder output because of the increased gain.

A further object of my invention is to provide a regenerative circuit in an amplitude limiter, which gives a very stable amount of feedback for changes in line voltage and tubes.

In accordance with the specific object of my invention, I introduce regenerative feedback from the discriminator primary circuit to the limiter tube cathode thereby to reduce the effects of diode loading on the primary; the feedback is inherently variable in amount with the intensity of received FM signal carrier with the result that the selectivity of the primary is a desirable function of received signal strength.

Still other objects of my invention are to improve amplitude limiter circuits for FM reception, and more particularly to provide a limiter-discriminator network of desirable characteristics.

Still other features will best be understood by reference to the following description, taken in connection with the drawing, in which I have indicated diagrammatically a circuit organization whereby my invention may be carried into effect.

Figure 1:
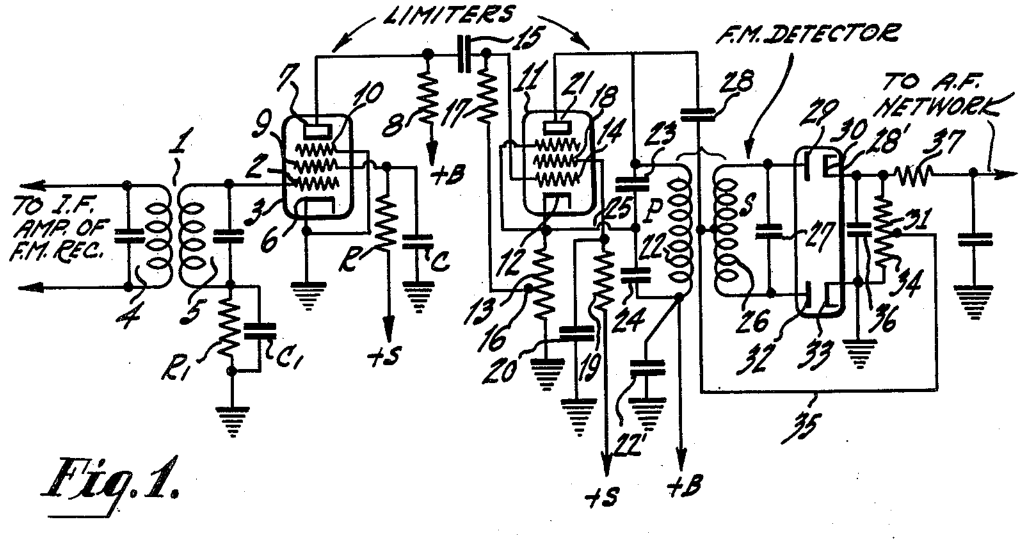
Fig. 1 shows one embodiment of the invention.

Referring now to the figures of the accompanying drawings, wherein like reference letters and numerals designate similar circuit elements, there is shown in Fig. 1 so much of an FM receiver as is essential to a proper understanding of my invention. It is assumed that the limiter and demodulator of Fig. 1 are embodied in a superheterodyne receiver, since that form of receiver is most widely employed at present. The customary selective radio frequency amplifier, converter and intermediate frequency amplifier precede the tuned input transformer 1 which feeds the I. F. signals to the signal grid 2 of limiter tube 3. Those skilled in the art of radio communication, and more specifically FM communication, are fully aware of the details of circuit design prior to limiter tube 3. The received FM waves may have a carrier, or center, frequency in any of the known frequency bands allocated to FM or PM reception. The present FM broadcast range extends from 42 to 50 megacycles (mc.). My invention, however, is not limited to operation in that band, but is readily adapted to the newly allocated 88–106 mc. band.

Assuming operation in the 42–50 mc. range, the selector circuits of the receiver between the antenna and discriminator network will each be designed satisfactorily to pass a band of frequencies of the order of 200 kilocycles (kc.). This relatively wide band pass selector characteristic is required, because in compliance with present standards of FM broadcasting the maximum frequency deviation at each FM transmitter is up to 75 kc. on either side of the normal carrier frequency. A pass band width of 200 kc. insures the acceptance of the overall 150 kc. frequency swing of a selected modulated carrier. The frequency variations of the signal energy are, of course, representative of the modulation applied to the carrier wave at the transmitter. Since a PM wave essentially differs from an FM wave in that the extent of frequency deviation is proportionately high for the higher modulating frequencies, it will be clear that the FM receiver may be employed for detection of PM waves with de-emphasis correction subsequent to the demodulator.

Assuming, now, that there has been applied to the resonant primary circuit 4 of I. F. transformer 1 the FM energy whose center or carrier frequency has been reduced to the operating I. F. value of 4.3 mc., each of circuits 4 and 5 is tuned to the I. F. value. The frequency value of 4.3 mc. is illustrative, and can be changed to any other suitable magnitude. The circuits 4 and 5 are coupled to provide a band pass response characteristic about 200 kc. wide. Limiting is accomplished by means of tube 3, shown as a pentode tube by way of specific illustration. The cathode 6, either indirectly or directly heated, is preferably connected directly to ground, while the low potential side of input circuit 5 is connected to ground by a resistor $R_1$ shunted by condenser $C_1$. The magnitudes of components $R_1$ and $C_1$ are so chosen as to provide a relatively short time constant. For example, and in no way restrictive, $R_1$ may be 150,000 ohms while $C_1$ may be 22 micro-microfarads (mmf.). The control grid 2 is connected to the high alternating potential side of circuit 5.

The plate or anode 7 of limiter tube 3 is connected to operate at a relatively low positive direct current potential. Thus, the plate 7 is connected through the resistor 8 to a point on a direct current source (not shown) having a potential of, for example, +250 volts. It will be observed that between the +250 volts point and the plate 7 substantial resistance is deliberately introduced into the plate circuit to reduce the normal plate voltage to such a low positive value, say +70 volts, that the tube will readily saturate. The screen grid 9 of tube 3 is connected to the +250 volts point through a resistor R whose upper end is bypassed to ground by condenser C. The values of R and C are so chosen that network R, C has a relatively short time constant. The normal no-signal voltage of the screen grid 9 will be relatively small. For example, the no-signal screen voltage may be as low as +70 volts. This screen voltage will increase when strong signals are present. As shown, the suppressor grid 10 is connected to cathode 6 within the tube envelope, and acts as a suppressor of secondary electrons emitted from plate 7.

The second stage of amplitude limiting is utilized to provide a substantial elimination of relatively rapid amplitude variations across the input terminals of the discriminator input network of the FM detector. The second limiter is generally constructed in the same manner as is the first limiter, but with certain changes now to be pointed out in detail. The tube 11 is shown as of the pentode type, and has its cathode 12 connected to ground through an unbypassed resistor 13. Resistor 13 is unbypassed to permit the introduction of feedback voltage into the cathode. The control grid 14, upon which FM signals are impressed through condenser 15, is returned for direct currents to an intermediate point 16 on the cathode resistor 13. The leak resistor 17 connects tap 16 to the grid 14.

The screen grid 18 of tube 11 is connected to the +S point of the direct current source through resistor 19, whose upper end is bypassed to ground for alternating current by condenser 20. The plate 21 of tube 11 is connected through the primary coil 22 to the +B point of the direct current source. Preferably the plate 21 should have full +250 volts applied thereto. The lower end of coil 22 is bypassed to ground by condenser 22′. The primary coil 22 is shunted by condensers 23 and 24 connected in series relation, and the junction of condensers 23 and 24 is connected by lead 25 to the ungrounded end of cathode resistor 13.

It will be observed that the limiter tube 11 utilizes a cathode resistor to establish the operating bias point for grid 14. The screen voltage and plate voltage of the tube are so chosen that the tube functions as a limiter. The normal screen voltage of tube 11 is preferably +70 volts.

The operating bias for grid 14 is so chosen that half cycles of the FM input potentials more negative than a predetermined negative voltage will cause cut-off of the plate current flow. Positive half cycles, due to the relatively low screen and plate voltages will cause saturation. The effect of cascading the limiters will be to provide a substantial elimination of response at the output of the FM detector to any amplitude variation of signal at the antenna of the receiver. The lead 25 provides a regenerative feedback path from the output circuit of tube 11. Such a regenerative, or positive, feedback is electrically equivalent to providing a negative resistance across primary circuit 22, 23, 24. The advantages of such injection of negative resistance into the plate circuit of tube 11 will be explained at a later point.

The coils 22 and 26 are the respective primary and secondary windings of the discriminator transformer. Coil 22 and condensers 23, 24 provide the resonant primary circuit P, while the secondary coil 26 and condenser 27 in parallel with it provide the resonant secondary circuit S. Condensers 23 and 24 in series tune coil 22 to the I. F. value. Circuit S is, also, tuned to the operating I. F. value of 4.3 mc. Circuits P and S are preferably coupled so as to provide a substantially double-humped response curve for the primary circuit P, while providing a band pass curve for the secondary circuit. The high alternating potential side of primary circuit P is connected to the mid-point of coil 26 through a direct current blocking condenser 28, which functions as a direct connection so far as the I. F. signal currents are concerned. In other words, condenser 28 imparts no phase shift to the I. F. currents applied to the mid-point of coil 26.

The circuits P and S constitute a discriminator network of the type described in the aforesaid Seeley patent, and referred to herein as a "Seeley discriminator." It is sufficient for the purposes of the present application to explain that at the instant when the applied I. F. energy has a frequency equal to the resonant frequencies of circuits P and S, the signal voltage across circuit S will be 90° out of phase with the voltage across primary circuit P. This is due to the magnetic coupling between resonant circuits P and S. However, the connection including condenser 28, will, also, inject into the circuit S primary signal voltage which has not been subjected to any phase shift.

Due to the fact that the primary voltage is applied to the mid-point of coil 26, it will be seen that from each end of coil 26 to ground there will exist primary signal voltage in phase quadrature with the induced phase-shifted signal voltage. The induced voltages in each half of the secondary coil 26 are of opposite polarity. Hence, there will exist between each end of coil 26 and ground a resultant voltage which is the vector sum of the phase quadrature-related voltages across each half of secondary winding 26 and the primary voltage. These resultant voltages will be of equal magnitude at the instant when the I. F. energy applied to circuit P is equal to the resonant frequencies of the discriminator circuits.

However, should the instantaneous signal frequency deviate or shift with respect to the predetermined reference frequencies of circuits P and S, then the resultant voltages at the opposite ends of coil 11 will become unequal because of phase changes away from the quadrature phase relation. The inequality will be dependent upon the magnitude of frequency deviation from the reference frequency, while the direction of the inequality will depend upon the direction of frequency deviation. In this way there is derived from the frequency-variable waves a pair of voltages which are equal in magnitude at the instant when the signal frequency is equal to the discriminator reference frequency, but which vary in magnitude with respect to each other for frequency deviations from the center frequency. The function of the rectifier tube 28' is to provide a pair of devices for rectifying the aforesaid pair of variable voltages.

Tube 28', while shown by way of example as a 6H6 type tube embodying a pair of separate diodes, may be a pair of indepedent diode tubes or other suitable rectifiers. The anode 29 and cathode 30 of the upper diode device are connected between the upper side of circuit S and the upper end of load resistor 31. The lower diode device 32, 33 is connected between the grounded end of load resistor 34 and the lower side of circuit S. The mid-point of secondary coil 26 is connected by lead 35 to the junction of load resistors 31 and 34. Hence, the resultant I. F. voltage applied to anode 29 will be rectified, and the rectified voltage will appear across resistor 31.

In the same way the resultant I. F. voltage applied to diode anode 32 will be rectified, and the rectified voltage will appear across resistor 34. Since the rectified voltages across resistors 31 and 34 are combined in polarity opposition relative to ground, the resultant potential at the end of resistor 31 connected to cathode 30 will be zero at the instant when the frequency of the applied FM waves is equal to the reference frequency of the discriminator circuits P and S, and will vary in magnitude and polarity depending respectively upon the extent and direction of frequency deviation. The resistors 31 and 34 are bypassed by a suitable I. F. bypass condenser 36, and the modulation frequency component of the resultant rectified voltage is applied through resistor-condenser network 37 to any suitable following audio frequency modulation amplifier network which may be followed by a suitable reproducer.

As explained previously, it is highly desirable to have the response curve of primary circuit P markedly double-humped. The secondary response curve S is relatively flat-topped with somewhat of a depression at its center. In practice, the transformer windings 22 and 26 are coupled approximately to the critical coupling value. It should be noted that the primary 22 is coupled to the diodes 29, 30 and 32, 33 both through the transformer windings and through condenser 28. Because of the connection including condenser 28, the response curve of the primary circuit P (as well as of the secondary circuit S) is important to the operation of the discriminator. The best overall discriminator characteristic, both as to linearity and length, is obtained when the response of the primary circuit P is substantially in accordance with a double-humped curve. If now, there occurs any flattening of the primary response curve, the effect will be to change the overall discriminator performance in a highly undesirable manner since the linear portion of the discriminator characteristic becomes shortened, and the discriminator characteristic is otherwise deleteriously affected.

It can be demonstrated that the two diodes 29, 30 and 32, 33 and their load resistors produce a damping effect on the primary circuit P which is the equivalent of that which would result if a resistor of approximately a small fraction of the value of load resistors 31 and 34 were placed directly in shunt across the primary circuit. In this connection, the action on the secondary circuit is only equivalent to the placing of a resistor of substantially higher value across the secondary circuit, so that the damping effect on the secondary is substantially less than on the primary. Therefore, the effect on the primary circuit P of increasing or decreasing the flow of current through the diodes is substantially greater than the action on the secondary circuit. It is readily seen that when the diodes are conductive, and current is flowing through them, there exists a relatively small impedance across the primary circuit. In other words the equivalent series resistance in the primary circuit, which causes damping action, is relatively high since it is inversely related to the shunt load. It is this positive damping resistance which is disadvantageous, so far as the range of the linearity of the detection characteristic is concerned. The higher the value of the I. F. the more serious is the effect of diode loading.

In accordance with my present invention, the effect of the shunt positive resistance across primary circuit P is simply and effectively reduced by shunting the primary circuit with a negative resistance. This negative resistance is created by virtue of the regenerative feedback path 25. Condenser 24 is much larger than condenser 23, and the drop across condenser 24 is fed back to the cathode 12 of tube 11. The cathode resistor 13 is unbypassed to permit the introduction of the feedback voltage into the cathode circuit. Hence, resistor 13 functions to provide the feedback voltage that gives the regeneration. The amount of regenerative feedback is preferably so chosen as to nullify the undesired loading of the primary circuit. The degree of regenerative feedback is dependent on received signal intensity. Strong signals cause the effective transconductance of the tube to be reduced, because of the bias developed. This decreases regenerative feedback through lead 25 from the discriminator primary circuit P to the cathode resistor 13 of the limiter tube 11. This is effectively equivalent to shunting the primary circuit with a negative resistance of decreased magnitude. As a result the positive resistance effectively shunted across the primary by the diode circuits is largely uncompensated, and the damping of the primary circuit P is relatively large. The selectively of the discriminator network P, S is broadened due to the damping, and the slope of the detection characteristic is caused to become less sharp. This is a desirable effect, since for strong signal reception noise and interference are relatively unimportant.

However, when weak signals are received the reverse action takes place. In the case of reception of weak FM signals (as in the case of an FM receiver in an automobile passing through an area tending to attenuate the FM signals), it is desirable to sharpen the discriminator selectivity thereby to reduce response to noise and interference. The amount of regenerative feedback is increased for weak signal reception. As a result, the magnitude of the negative resistance across the discriminator primary is increased, thereby counter-acting the effect of the shunt positive resistance provided by the diode circuits. This reduces the damping of the primary circuit and sharpens the response band of the discriminator. Hence, the magnitude of the negative resistance effect introduced across the discriminator primary is automatically adjustable in response to the received carrier strength. The regenerative feedback circuit acts, therefore, in the manner of an automatic selectivity control over the discriminator network.

Figure 2:
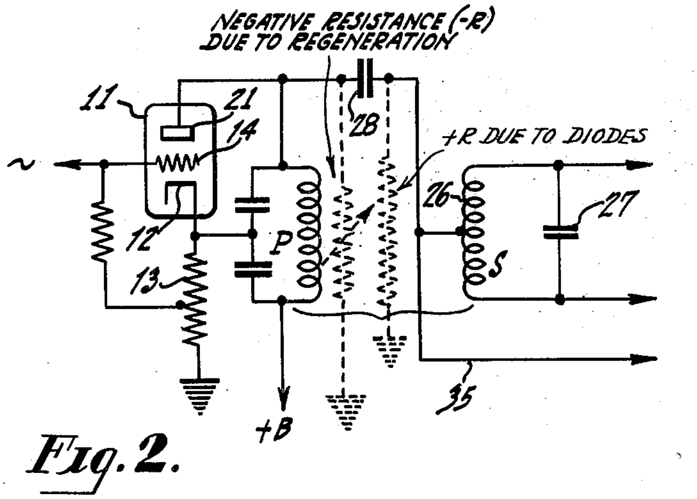
Fig. 2 shows an equivalent circuit diagram of the discriminator circuit of Fig. 1.

Fig. 2 shows the equivalent of the discriminator circuit of Fig. 1. The shunt negative and positive resistances (respectively shown as $-R$ and $+R$ in dashed lines) are indicated. In this simple and effective manner I make it possible to correct for undesirable damping or loading of the discriminator primary without having to change the values of the load resistors and/or the "Q" of the discriminator coils. It is pointed out that when $-R$ is shunted across the primary circuit P, it affects chiefly the selectivity of the primary. However, the overall selectivity of P, S, is afrected depending on how tightly the secondary S is coupled to the primary P.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In a frequency modulated carrier wave receiver, a carrier wave amplifier having a cathode, a control grid and an anode, means for impressing said carrier wave between said cathode and grid, an unbypassed resistor for connecting said cathode to a point of fixed potential, a frequency discriminator network coupled between said anode and a point of fixed potential, said network including a primary circuit resonant to the center frequency of said carrier wave, a balanced rectifier system effectively coupled across said primary circuit and causing excessive damping thereof, and a positive feedback connection between said cathode and an intermediate point of said primary circuit to reduce said damping and to maintain the linearity of the discriminator curve regardless of the strength of said carrier wave.

2. In a frequency modulated carrier wave receiver, a limiter having input and output electrodes, a carrier wave amplifier having a cathode, a control grid and an anode, means for impressing said carrier wave between the input electrodes of said limiter, means for coupling the output electrodes of said limiter to said control grid and cathode to impress the limited carrier wave thereon, an unbypassed resistor for connecting said cathode to a point of fixed potential, a frequency discriminator network coupled between said anode and a point of fixed potential, said network including a primary circuit parallel resonant to the center frequency of said carrier wave and having a pair of serially connected capacitors, a balanced rectifier system effectively coupled across said primary circuit and causing excessive damping thereof, and a positive feedback connection between said cathode and the junction point of said pair of capacitors to reduce said damping and to maintain the linearity of the discriminator curve regardless of the strength of said carrier wave.

3. In a frequency modulated carrier wave rereceiver, a carrier wave limiter having a cathode, a control grid and an anode, means for impressing said carrier wave between said cathode and grid, an unbypassed resistor for connecting said cathode to a point of fixed potential, a frequency discriminator network coupled between said anode and a point of fixed potential, said network including a primary circuit parallel resonant to the center frequency of said carrier wave and having a pair of series connected capacitors, one of said capacitors having a larger capacitance than the other one, a pair of balanced diode rectifiers effectively coupled across said primary circuit and causing excessive damping thereof, and a connection between said cathode and the junction point of said pair of capacitors to feed back regeneratively the voltage drop across the larger one of said capacitors, thereby to reduce said damping and to maintain the linearity of the discriminator curve regardless of the strength of said carrier wave.

WINFIELD R. KOCH.

REFERENCES CITED

The following references are of record in the file of this patent:

UNITED STATES PATENTS

| Number | Name | Date |
|---|---|---|
| 2,171,139 | Cornelius | Aug. 29, 1939 |
| 2,259,891 | Hunt | Oct. 21, 1941 |
| 2,273,097 | Foster et al. | Feb. 17, 1942 |
| 2,298,629 | Schaper | Oct. 13, 1942 |
| 2,361,669 | Weagant | Oct. 31, 1944 |
| 2,379,688 | Crosby | July 3, 1945 |
| 2,379,721 | Koch | July 3, 1945 |
| 2,395,738 | Hanson et al. | Feb. 26, 1946 |

FOREIGN PATENTS

| Number | Country | Date |
|---|---|---|
| 205,117 | Great Britain | Oct. 8, 1923 |